(12) United States Patent
Howe et al.

(10) Patent No.: US 10,579,428 B2
(45) Date of Patent: Mar. 3, 2020

(54) DATA TOKEN MANAGEMENT IN DISTRIBUTED ARBITRATION SYSTEMS

(71) Applicant: International Business Machines Corporation, Armonk, NY (US)

(72) Inventors: Daniel C. Howe, Pflugerville, TX (US); Harrison MinHo McCreary, Williamson, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,679

(22) Filed: Dec. 1, 2017

(65) Prior Publication Data

US 2019/0171488 A1 Jun. 6, 2019

(51) Int. Cl.
*G06F 13/37* (2006.01)
*G06F 9/50* (2006.01)
*G06F 9/48* (2006.01)

(52) U.S. Cl.
CPC .......... *G06F 9/5038* (2013.01); *G06F 9/4843* (2013.01); *G06F 9/5011* (2013.01); *G06F 13/37* (2013.01); *G06F 2209/5021* (2013.01)

(58) Field of Classification Search
CPC ............................. G06F 13/5038; G06F 13/37
See application file for complete search history.

(56) References Cited

U.S. PATENT DOCUMENTS

| | | |
|---|---|---|
| 6,651,083 B1 | 11/2003 | Robertson et al. |
| 7,023,874 B2 | 4/2006 | Hauck et al. |
| 7,047,284 B1 | 5/2006 | Agarwala et al. |
| 7,668,970 B2 | 2/2010 | Blumrich et al. |
| 9,294,300 B2 | 3/2016 | Janz et al. |
| 2003/0079072 A1* | 4/2003 | Takeda ................. G06F 13/364 710/113 |
| 2004/0186864 A1 | 9/2004 | Hsu et al. |
| 2004/0210696 A1* | 10/2004 | Meyer ..................... G06F 13/37 710/240 |
| 2013/0152090 A1 | 6/2013 | Balko |
| 2018/0324071 A1* | 11/2018 | D'Ercoli ............. H04L 43/0876 |

* cited by examiner

*Primary Examiner* — Zachary K Huson
(74) *Attorney, Agent, or Firm* — Jared C. Chaney (57) ABSTRACT

A method for processing a token at a local device in a distributed arbitration system includes: receiving a first signal from first device indicating a request for access to a shared resource; receiving an indicator from a processing component of the local device indicating whether the processing component requires access to the shared resource; receiving a second signal from the local device, where a component of second signal indicates whether the local device has greater priority than another device in the set of one or more devices to access the shared resource; receiving a token from the chain network, the token granting a device access to the shared resource; determining a disposition of the token using the first signal and the second signal; disposing the token to allocate the shared resource to a device in response to the determined disposition; and updating the second signal in response to the determining.

20 Claims, 8 Drawing Sheets

| CASE | | | | | TOKEN DISPOSITION/CONTROL | | |
|---|---|---|---|---|---|---|---|
| TOKEN IN | TOKEN STORED | POSSESSION | LOCAL REQUEST | NULL REQUEST | STORE | DROP | CONSUME |
| TOKEN IN NOR STORED (NO TOKENS) | | X | X | X | NO | NO | NO |
| TOKEN IN XOR STORED (1 TOKEN) | | NO | X | X | NO | YES | NO |
| TOKEN IN XOR STORED (1 TOKEN) | | YES | NO | NO | NO | YES | NO |
| TOKEN IN XOR STORED (1 TOKEN) | | YES | NO | YES | YES | NO | NO |
| TOKEN IN XOR STORED (1 TOKEN) | | YES | YES | X | NO | NO | YES |
| TOKEN IN AND STORED (2 TOKENS) | | X | NO | X | YES | YES | NO |
| TOKEN IN AND STORED (2 TOKENS) | | YES | YES | X | NO | YES | YES |
| TOKEN IN AND STORED (2 TOKENS) | | YES | YES | NO | NO | YES | YES |
| TOKEN IN AND STORED (2 TOKENS) | | YES | YES | YES | YES | NO | YES |

FIG. 7

FIG. 8

DATA TOKEN MANAGEMENT IN DISTRIBUTED ARBITRATION SYSTEMS

BACKGROUND

The present disclosure relates to computer hardware, and more specifically, to resolving resource contention in token based distributed arbitration systems.

In some computing systems, two or more devices can share access to a common resource. In a multiprocessor system, for example, two or more processors can share a common cache, system bus, memory controller, coprocessor, or accelerator. Resource contention can arise when two or more devices attempt to concurrently access a given resource. Arbitration is a technique is which devices are selected to access, or are granted control of, a shared resource on an ordered or priority basis.

SUMMARY

According to embodiments of the present disclosure, a method for processing a token at a local device in a distributed arbitration system includes receiving a first signal from a first device in a set of one or more devices, wherein the set of one or more devices is disposed in a chain network downstream from the local device and the first signal indicates a request from each of the one or more devices for access to a shared resource. The method further includes receiving an indicator from a processing component of the local device, where the indicator indicates whether the processing component requires access to the shared resource. The method further includes receiving a second signal from the local device, where a component of second signal indicates whether the local device has a greater priority than another device in the set of one or more devices to access the shared resource. The method further includes receiving a token from the chain network, the token granting a device access to the shared resource. The method also includes determining a disposition of the token using the first signal and the second signal. The method additionally includes disposing the token to allocate the shared resource to a device in response to the determined disposition. The method further includes updating the second signal in response to the determining.

Other embodiments are directed to systems and computer program products for processing a token at a local device in a distributed arbitration system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer hardware, more particular aspects relate to resolving resource contention in token based distributed arbitration systems. While the present disclosure is not necessarily limited to such applications, various aspects of the disclosure may be appreciated through a discussion of various examples using this context.

Distributed arbitration system can be used to resolve contention between devices that share a common resource in a system or network. In a distributed arbitration system, each device contending for access to a shared resource takes part in selecting or determining which device ultimately obtains, or controls, the shared resource. As a means for resolving contention in distributed arbitration systems, tokens can be used to indicate a right to access, or control of, a shared resource. A token, for example, can indicate ownership of array space, arbitration tenures on a computer system bus, or other available shared resources. Devices in token based distributed arbitration systems can be disposed (e.g., arranged) in a network (e.g., a token chain, a ring network, or a chain network) where a token is serially passed downstream from one device unit to another device. These token based distributed arbitration systems can rely on a continuous flow of tokens to remain efficient (e.g., to service requests for access to resources with a minimum latency). Token based distributed arbitration systems can incorporate after-the-fact starvation mechanisms to mitigate or avoid live-lock situations during periods of high contention (e.g., during periods where more devices require access to a shared resource than there are available tokens). After-the-fact starvation mechanisms, however, can result in unfair advantage to devices that reside upstream from other devices in a network. The unfair advantage can enable these upstream devices to obtain greater, or more frequent, access to a shared resource than a system design might otherwise allow.

Embodiments of the present disclosure present a technique (e.g., a method, system, and computer program product) that can limit the effects of resource contention among disparate devices manifesting as unfairness to downstream devices in a token based distributed arbitration system during starvation conditions. The technique can also enable low latency performance of the system under nominal conditions, even in token based distributed arbitration systems having a low token injection rate. Accordingly, the technique includes equipping each device with an arbitration unit (e.g., a token manager). The arbitration unit can capture (e.g., hold or store) a single token for its associated device. The number of held or stored tokens, however, can be configured to meet requirements of specific arbitration systems. The arbitration component can also maintain (e.g., store and update) a possession vector describing the priority of the associated device over other downstream devices in the token base distributed arbitration system. The state or authority of the possession vector can be maintained according to a token request vector (hereinafter, "request vector") which is forwarded upstream by each downstream device. The request vector can be visible to all upstream devices. When an arbitration event occurs (e.g., when access to a resource becomes available, or when new token is injected into the arbitration system), the arbitration unit determines whether the associated device to either retain (e.g., store or consume) one or more tokens, or to drop (e.g., pass or forward) the one or more tokens downstream based, at least in part, on the state of the authority vector and the request vector.

According to various embodiments, a technique for processing a token at a local device (e.g., a local node) in a distributed arbitration system includes receiving a request vector (e.g., a first signal) from a device (e.g., a first node) in a set of one or more devices disposed in a network downstream from the local device. The technique can be executed by an arbitration unit with the local device. As used herein, a first device is downstream from a second device in a network when the first device receives a token after the token passes through, or is dropped by, the second device.

The request vector can be a data object, such as a bit array or a bit vector, transmitted upstream through a communication channel (e.g., a computer system bus) connecting devices in the network. An element, or bit, of the request vector can indicate a request from a downstream device for a token (e.g., a request for access to a shared resource). In some embodiments, the position of an element in the request vector (e.g., a component of the request vector) can correspond to the relative position in the network of a node that transmitted the token request indicated by the element. For example, a token request transmitted by the last device in a network can be indicated by the last bit (e.g., the right most bit) in the request vector. Similarly, a token request transmitted by the second to last device in a network can be indicated by the second to last bit in the request vector. Each downstream device in the network combines its token request with a request vector received from the next downstream device into a single local request vector. The local request vector is then forwarded to the next upstream device. As an example, the last device in a network can add its token request to an empty request vector and forward it upstream to the next device in the network. The next upstream device receives this request vector, adds its token request to the appropriate element in the request vector, and forwards it to a subsequent upstream device. As a consequence of these operations, each device in the network can be aware of the token requests of each device downstream from it in the network.

The technique further includes receiving, from a processing component of the local device, an indicator indicating whether the processing component (e.g., the local device) requires access to the shared resource. In some embodiments, the indicator can be a bit or other data object read from a memory of the processing component or the local device. In certain embodiments, the indicator can be a logic signal received from a circuit (e.g., an electronic circuit) of the processing component or the local device.

The technique further includes receiving a possession vector (e.g., a second signal) from the local device. The possession vector can be a bit vector, a bit array, or any other data object maintained by the local device. In embodiments, the possession vector can be read from a memory of the local device. In other embodiments, the possession vector is received in a signal from a circuit of the local device. In some embodiments, the possession vector has the same data width (e.g., contains the same number of elements or components) as the request vector. Elements in the possession vector (e.g., a component of the possession vector) correspond to elements in the request vector (e.g., the local request vector). An element in the possession vector can indicate whether the local device has a greater priority to a token (e.g., to access a shared resource) than a downstream device corresponding with the element (e.g., a downstream device whose position in the network is the same as the position of the element in the possession vector).

The technique further includes receiving, from the network (e.g. the token base distributed arbitration system), a token granting a node access to, or control of, the shared resource. The token can be a data object received from, for example, an arbitration control of the token based distributed arbitration system. The arbitration control unit can regulate, or control, the injection of tokens into the token based distributed arbitration system. In some embodiments, receiving the token can include reading or accessing a previously received token stored in the local device.

The technique further includes determining a disposition of the received token. Determining the disposition of the received token can include determining whether to consume the token (e.g., use the token to access the shared resource), store the token (e.g., store the token in, or write the token to, a memory element), or drop the token (e.g., pass the token on to the next downstream device in the network). In some embodiments, the arbitration unit determines a disposition of the received token based on at least one of the received token, the indicator, request vector, and the possession vector. More specifically, the arbitration unit can determine a disposition of the received token based on the number of tokens accessible to the arbitration unit, whether the local device has priority over all downstream devices to the tokens (e.g., whether the local device has a greater priority to access the shared resources), and whether the request vector is null (e.g., the local device's request vector indicates that no downstream device has a token request).

In some embodiments, the request vector and the possession vector is used to determine whether the local device has priority over one or more downstream devices. A local device has priority over a downstream device when the local device's possession vector indicates that an element associated with the downstream device is set (e.g., the element has a value of one). In some embodiments, local device has priority over all downstream devices (e.g., the local device can consume or store a received token) when all elements in the local device's possession vector are set. In some embodiments, the local device has priority to received tokens (e.g., a shared resource) when only a subset of elements of the local device's possession vector are set if only a corresponding subset of elements in the local device's request vector are set. In other embodiments, other criteria for determining whether a local device has priority to received tokens based on the possession vector and the request vector can be utilized.

According to various embodiments, when an arbitration unit has access to only a single token, the token based distributed arbitration system is in a starvation state (e.g., the arbitration system does not have enough tokens to enable all devices to access the shared resource with a minimum latency). An arbitration unit can have access to only one token when an arbitration event has occurred, the arbitration unit has a token stored, and the arbitration unit did not receive a new token from either an upstream device or from an arbitration control unit. An arbitration unit can also have access to only one token when the arbitration unit does not have a stored token at the time of an arbitration event, but has received a new token from either an upstream device or from an arbitration control unit.

According to various embodiments, while the token based distributed arbitration system is in a starvation state, a received or stored token will be dropped to the next downstream device in response to an arbitration event when the local device does not have absolute possession of the token, as described herein. The received or stored token can also be dropped in response to an arbitration event when the local device has absolute possession of the token, the local device did not have a request for the token, and at least one downstream device requested a token, as described herein. The received or stored token can be consumed in response to an arbitration event when the local device has absolute possession of the token and the local device did request a token. The received or stored token can be stored in response to an arbitration event when the local device has absolute possession of the token, the local device did not request a token, and no downstream devices requested tokens.

The conditions for determining the disposition of a received or stored token while the arbitration system is in a starvation state can enforce a particular rate of token consumption verses token dropping. Other combinations of conditions can be selected or used to enforce different balances between token consumption and token dropping.

According to various embodiments, when an arbitration unit has access to a set of tokens (e.g., two tokens), the token based distributed arbitration system is in a nominal state (e.g., the arbitration system has enough tokens to enable all devices to access the shared resource with a minimum latency). An arbitration unit can have access to a set of tokens when an arbitration event occurs and the local device has a token stored from a previous arbitration event and receives another token prior to, or in response to the current arbitration event. While the arbitration system is in a nominal state, the arbitration unit can drop or consume the set of tokens (e.g., the arbitration unit can drop one token to a downstream device while consuming another token) in response to an arbitration event when the local device has absolute possession of the tokens, the local device requested a token, and no downstream nodes requested a token. The arbitration unit can also drop and consume a set of tokens in response to an arbitration event when the local device does not have absolute possession of the tokens and the local device requests a token (e.g., the arbitration unit can direct the local device to consume one or more tokens in the set of tokens while dropping one or more other tokens in the set of tokens).

The arbitration unit can store and drop a set of tokens (e.g., one token can be stored while another token is dropped) in response to an arbitration event when the local device does not request token. Additionally, the arbitration unit can store and consume a set of tokens (e.g., one token can be stored while another token is consumed) in response to an arbitration event when the local device has absolute possession of the tokens, the local device requested a token, and at least one downstream device requested a token.

The conditions for determining the disposition of a set of received or stored token while the arbitration system is in a nominal state can prevent overly aggressive (e.g., too frequent) capturing of tokens when the local arbitration unit has absolute possession of a token. Other combinations of conditions can be selected or used to enforce different capturing criteria in the nominal state.

The technique can further include disposing of the token to, for example, allocate the shared resource to a device in response to the determined disposition. Disposing of the token can include storing, consuming, and dropping the token, as described herein.

The technique can further include updating the possession vector in response to the determined disposition of a token. Updating the possession vector can include clearing the possession vector (e.g., setting all elements of the possession vector to zero) when a token is consumed or stored. In some embodiments, a cleared possession vector can indicate that all downstream devices have priority over the local device. When a token is dropped by the local device, updating the possession vector can also include setting an element (e.g., a bit) in the possession vector corresponding to a downstream device that has a token request in the local device's request vector. When a token is dropped and no downstream device has a request in the local device's request vector, the local device's possession vector can be updated by setting a random element in the possession vector. In some embodiments, setting an element of the possession vector can indicate that the local device has priority over the downstream node corresponding to the set element.

In some embodiments, the technique includes updating the received request vector with the received indicator, in an instance where the request vector changes after an arbitration event and as the request vector is passed between nodes. The technique can further include transmitting the updated request vector an upstream node.

Figure 1:
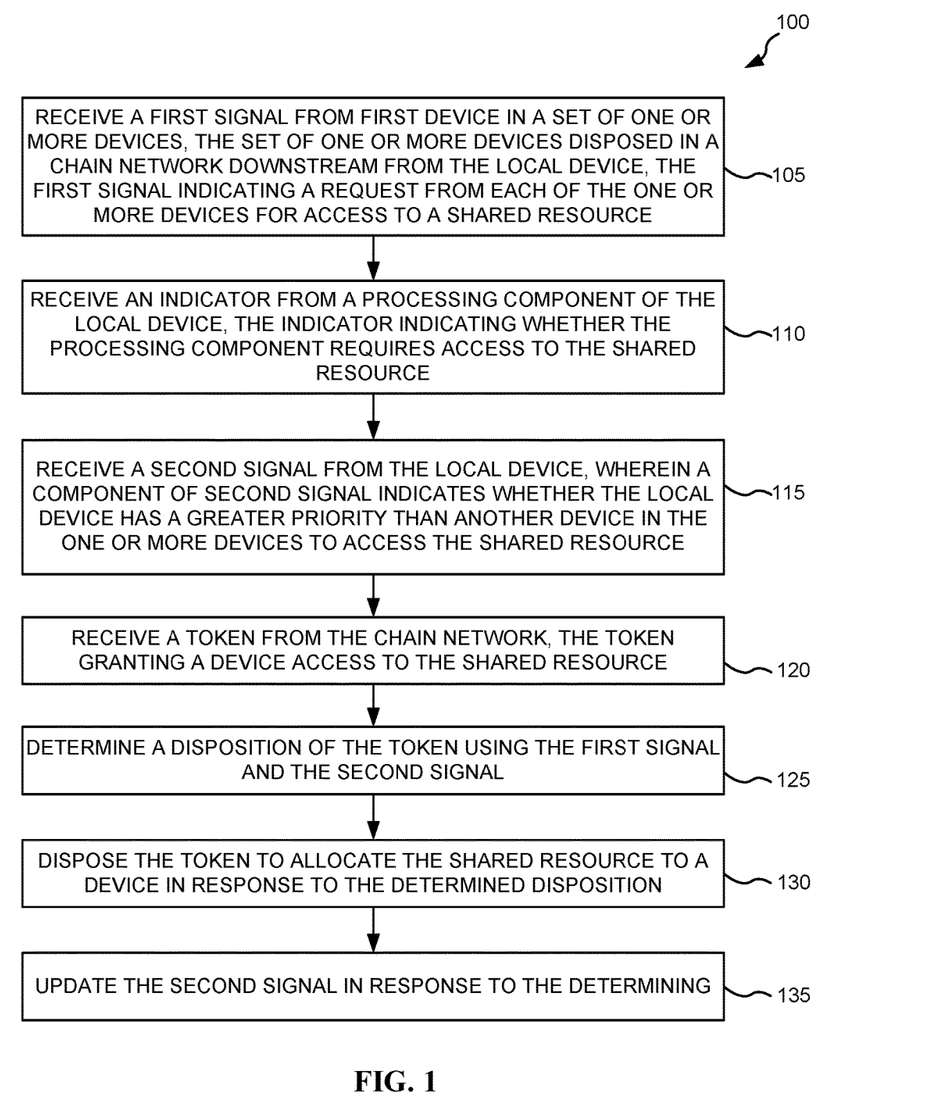
FIG. 1 depicts a set of operations for processing a token at a device in a distributed arbitration system to resolve resource contention, according to various embodiments.
Figure 2:
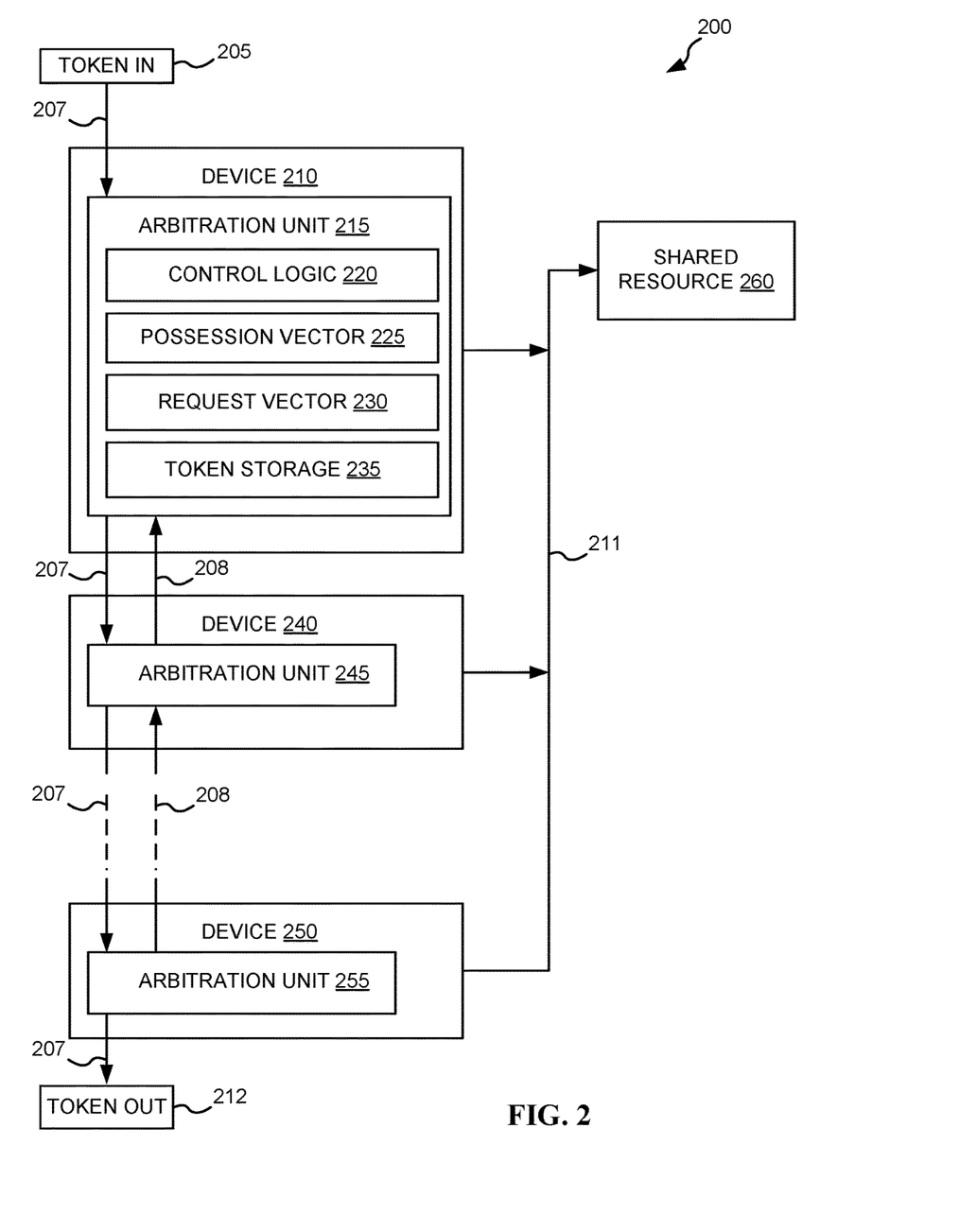
FIG. 2 depicts a block diagram of a system for processing a token at a device in a distributed arbitration system to resolve resource contention, according to various embodiments.

Referring now to the figures, FIG. 1 depicts a set of operations 100 for processing a token at a node in a distributed arbitration system to resolve resource contention. The operations 100 can be executed by an arbitration unit, such as the arbitration unit 215 (FIG. 2). In some embodiments, the arbitration unit includes electronic circuits configured to execute the operations 100. In other embodiments, the arbitration unit includes software embodying the instructions for executing the operations 100, and a processor for executing the software.

At operation 105, the arbitration unit can receive a request vector (e.g., a first signal) from a first device in a set of one or more devices disposed in the chain network downstream from a local device (e.g., a device having the arbitration unit), as described herein. The request vector can indicate a request from each of the one or more devices for access to a shared resource (e.g., a token request), as described herein.

At operation 110, the arbitration unit can receive an indicator from a processing component of the local device.

The indicator can indicate whether the processing component (e.g., the local device) requires access to the shared resource, as described herein.

At operation 115, the arbitration unit can receive a possession vector (e.g., a second signal) from the local device. In some embodiments, an element of the possession vector indicates whether the local device has a greater priority than another device in the set of one or more devices to access the shared resource, as described herein.

At operations 120, the arbitration unit can receive, from the network, a token granting a device access to, control of, the shared resource, as described herein.

At operation 125, the arbitration unit can determine a disposition of the received token using on the request vector and the possession vector, as described herein.

At operation 130, the arbitration unit can dispose of the token (e.g., store, consume, or drop the token) to allocate the shared resource to a node in response to the determined disposition, as described herein.

At operation 135, the arbitration unit can update the possession vector in response to determining a disposition of the received token, as described herein.

Figure 8:
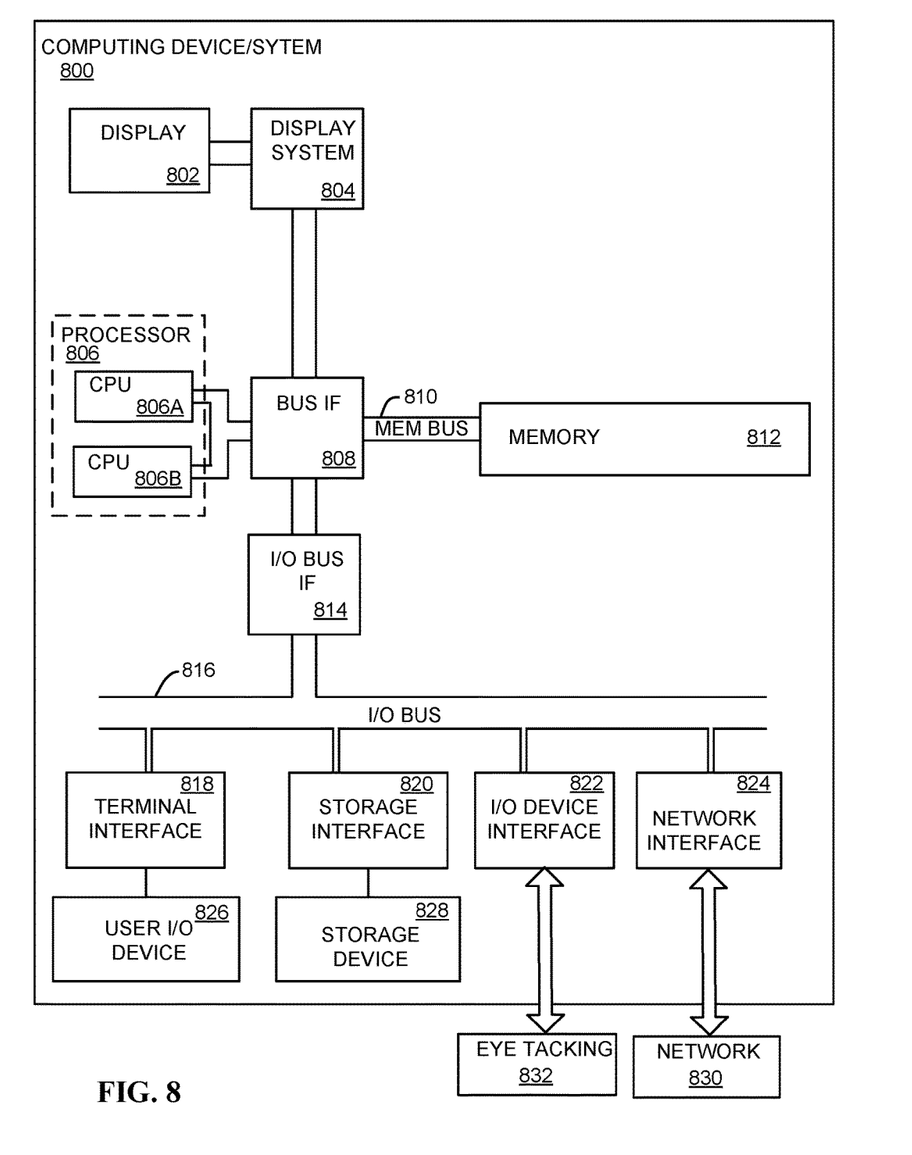
FIG. 8 depicts a block diagram of a computing device including components for implementing the operations and systems to resolve resource contention in a distributed arbitration system, according to various embodiments.

FIG. 2 depicts a block diagram of a system 200 for processing a token at a node in a distributed arbitration system to resolve resource contention, according to various embodiments. In some embodiments, the device 210, 240, and 250 are computing systems, such as the computing system 800 (FIG. 8). In other embodiments, the device 210, 240, and 205 are components of a computing system (e.g., processors, accelerations, etc.). The device 210, 240, and 250 can contend for access to shared resource 260 through communication channel 211. In some embodiments, the shared resource 260 is any shared hardware resource (e.g., space on a storage array, arbitration tenures on a data or communication channel, and time on an processing component of a computing system). In some embodiments, the shared resource 260 can be a software resource. In certain embodiments, the communication channel 211 can be the shared resource 260.

Device 210, 240, and 250 can be connected as network (e.g., a chain network) through communication channel 207 and communication channel 208. In some embodiments, the communication channel 207 and the communication channel 208 can be bus of a computing system, one or more electrical traces on a printed circuit board, or data cable. A local device can any one of the device 210, 240, and 250. As an example, the local device can be device 210, while devices 240 and 250 are downstream devices in the network. Token requests (e.g., request vectors) can be transmitted from downstream devices to upstream devices using communication channel 208. Tokens can be dropped, or passed, to downstream nodes using communication channel 207. An input token 205 can be received from an arbitration control unit (not shown) at device 210 and passed downstream to devices 240 and 250. Device 250 can pass the output token 212 to additional devices (not shown).

Device 210 includes arbitration unit 215, device 240 includes arbitration unit 245, and device 250 includes arbitration unit 255. In some embodiments, each arbitration unit can include identical circuits and software for executing the operations described herein. Each arbitration unit, for example, can include control logic 220, possession vector 225, request vector 230, and token storage 235. Possession vector 225 and request vector 230 can be data objects or circuits configured to store data objects, as described herein. Control logic 220 can include control circuitry or software for executing the operations described herein. Token storage 235 can be a circuit or a data object configured to store a received token received.

Figure 3:
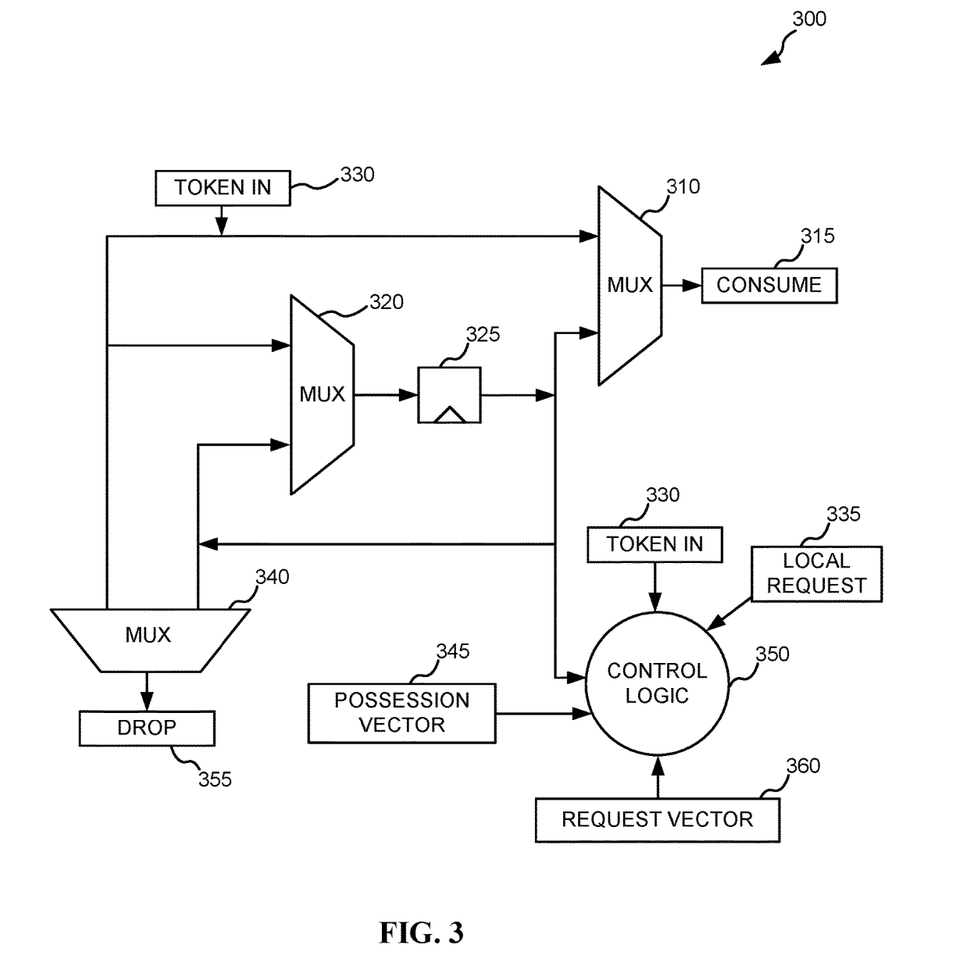
FIG. 3 depicts a block diagram of an example arbitration unit for use in a distributed arbitration system for processing a token at a device to resolve resource contention, according to various embodiments, according to various embodiments.

FIG. 3 depicts a block diagram of an example arbitration unit 300 for use in a distributed arbitration system for processing a token at a local device to resolve resource contention, according to various embodiments. The arbitration unit 300 can include control logic 350, storage multiplexer 320, consumption multiplexer 310, and dropping multiplexer 340. The control logic 350 can receive input signals token in 330, local request 335, possession vector 345, and request vector 360. The control logic 350 can execute the operations of the present disclosure using the received input signals token in 330, local request 335, possession vector 345, and request vector 360 to determine whether a local device associated with the arbitration unit 300 disposes of the received token 330 by consuming 315, storing (e.g., in latch or register 325) and dropping 355 the token, as described herein.

Figure 4:
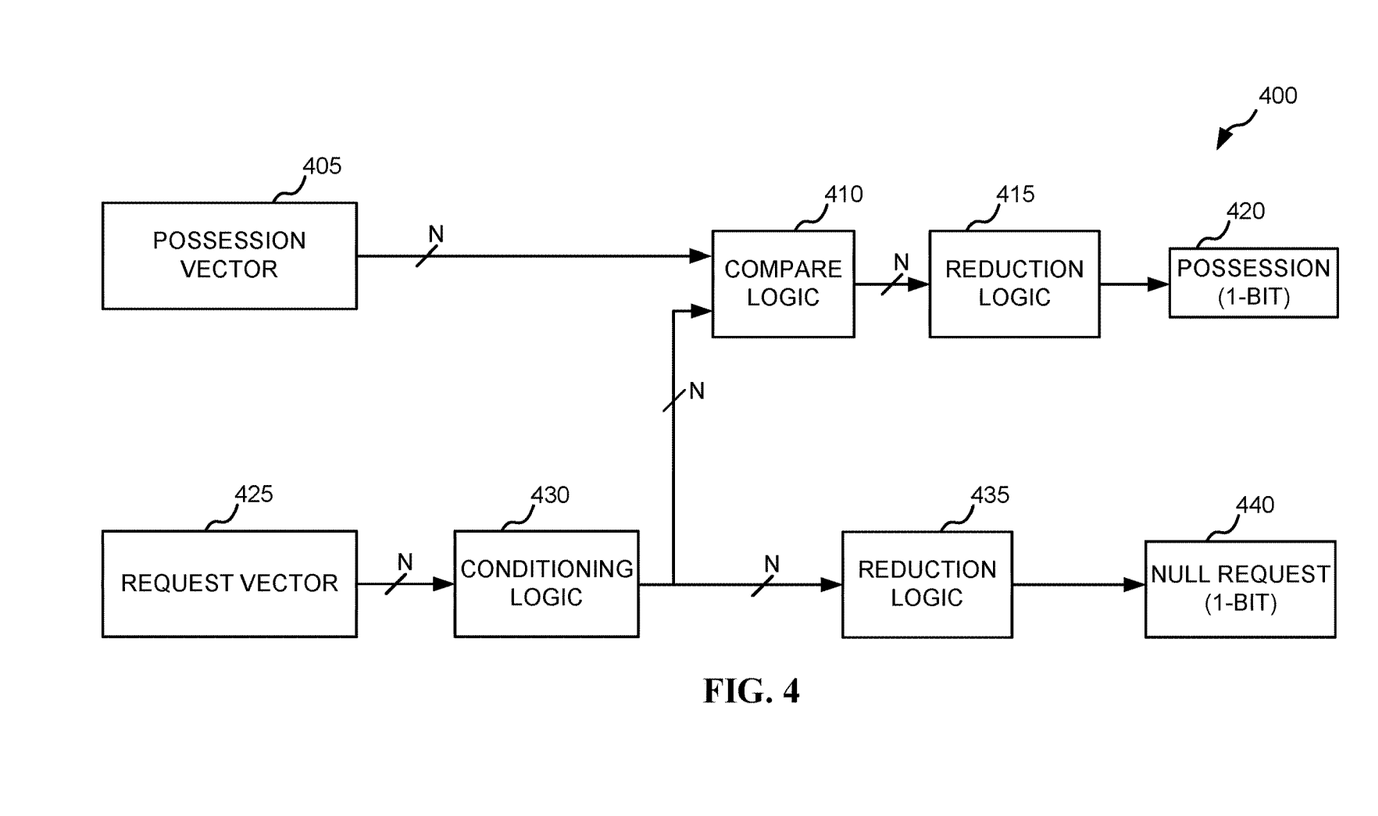
FIG. 4 depicts a block diagram of example signal generating logic for generating control signals for use in a distributed arbitration, according to various embodiments.

FIG. 4 depicts a block diagram of example signal generating logic 400 for generating control signals for use in a distributed arbitration system, according to various embodiments. The diagram indicates logic blocks for generating possession 420 and null request 440 control signals using the possession vector 405 and the request vector 425. In some embodiments, possession signal 420 is set (e.g., set to a value of one) to indicate that a local device has absolute possession of a token, as described herein. Null request signal 440 can be set (e.g., set to value of one) indicate that no devices downstream from the local device has requested a token (e.g., the local node's request vector is null). The possession vector 405 and the request vector 425 can each have a data width of N elements. Compare logic 410 can be bitwise or element-wise comparison logic circuit which compare each element in the possession vector 405 to each corresponding element in the request vector 425 after the request vector is processed through conditioning logic 430. Compare logic 410 can be a set of N two input OR gates, while conditioning logic 430 can be a set of N inverters. Reduction logic 415 and 435 can be N input one output AND gates.

Other logic circuits can be used to generate a desired relationship between possession vector 405, request vector 425, possession signal 420 and null request signal 440. In some embodiments null request 440 is neither generated nor used an arbitration unit in a distributed arbitration system.

A notable feature of the signal generating logic 400 is that it enables possession signal 420 to be set (e.g., indicating that a local device has absolute possession of a token) when only a subset of element in the possession vector 405 is set and a corresponding subset of elements in the request vector 425 is set, as described herein.

Figure 5:
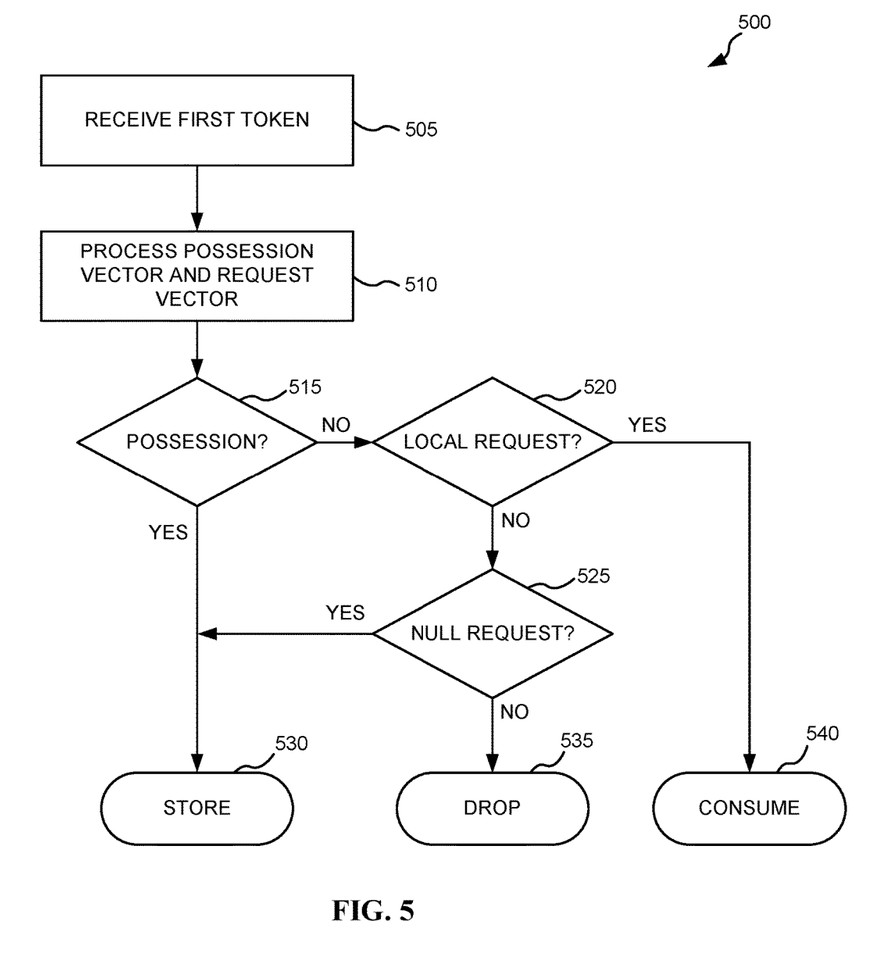
FIG. 5 depicts an example set of operations for determining the disposition of a single token at a device in a distributed arbitration system, according to various embodiments.

FIG. 5 depicts an example set of operations 500 for determining the disposition of a single token at a local device in a distributed arbitration system, according to various embodiments. The operations 500 can be executed by an arbitration unit, such as the arbitration unit 215, in response to an arbitration event. At operation 505, the arbitration unit can receive a first token, as described herein. The arbitration unit can then process the possession vector and the request vector associated with the local device using, for example the signal generating logic 400, as shown in operation 510. The arbitration unit can then determine whether the local device has absolute possession of the received token, as shown in operation 515. The arbitration unit can store the received token in response to determining that the local device has absolution possession of the received token, as shown in operation 530.

The arbitration unit can determine whether the local device requested a token at operation 520, in response to determining that the local device does not have absolute possession of the received token. The arbitration unit can consume the received token in response to determining that the local device requested a token, consistent with operation 540.

The arbitration unit can determine whether the local device's request vector is empty (e.g., no downstream nodes have requested a token), as shown in operation 525. The arbitration unit can continue to operation 530 and store the received token when the request vector is empty (e.g., the request vector is cleared), while the arbitration unit can proceed to operation 535 and drop the received token when the request vector is not empty.

Figure 6:
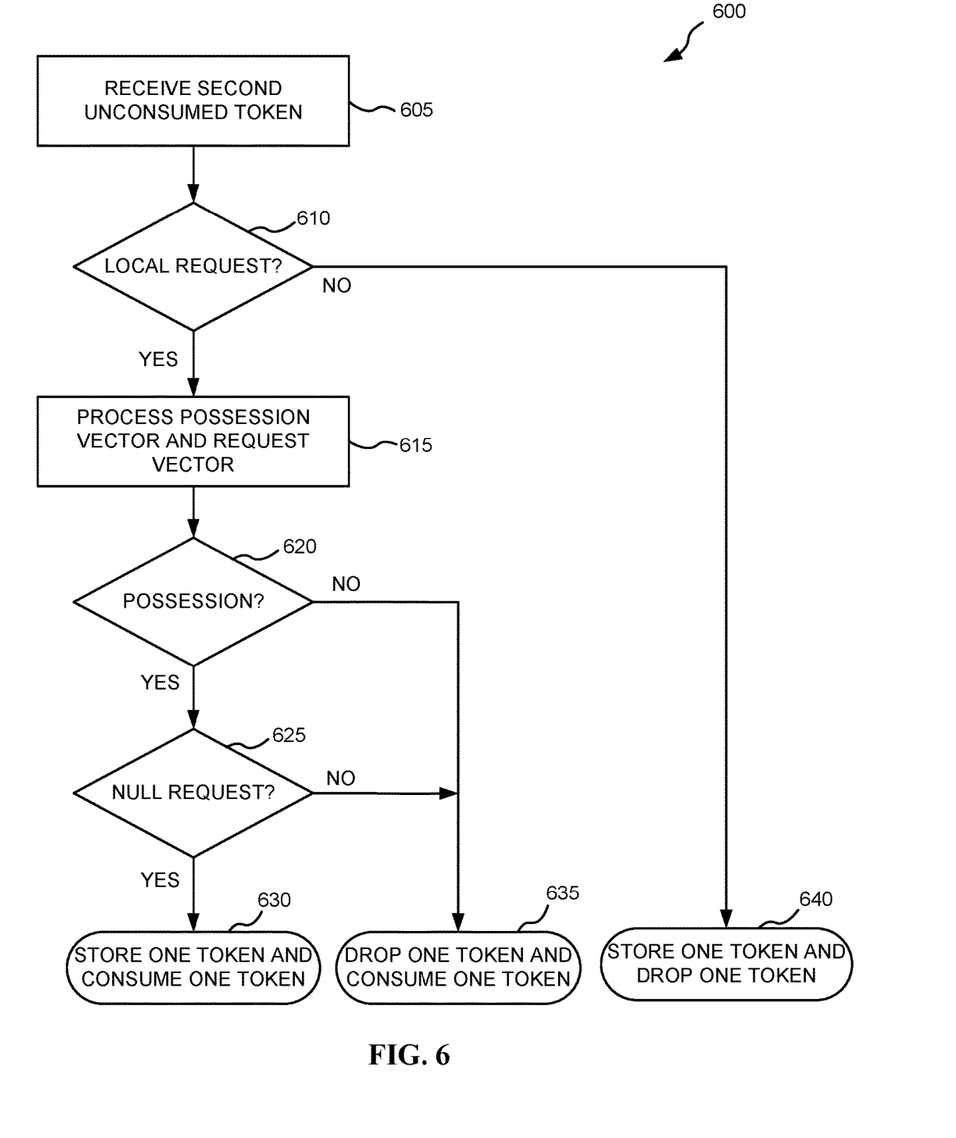
FIG. 6 depicts an example set of operations for determining the disposition of two tokens at a device in a distributed arbitration system, according to various embodiments.

FIG. 6 depicts an example set of operations for determining the disposition of two tokens (e.g., a set of tokens) at a device in a distributed arbitration system, according to various embodiments. The operations 600 can be executed by an arbitration unit, such as the arbitration unit 215. At operation 605, the arbitration unit can receive a second token (e.g., the arbitration unit has a stored token and has received a token from an upstream node), as described herein.

The arbitration unit can determine whether the local device requested a token at operation 610. The arbitration unit can store a token and drop a token in response to determining that the local device did not request a token, as shown in operation 640. Alternatively, the arbitration unit can proceed to operation 615 in response to determining that the local device did request a token.

At operation 615, the arbitration unit can process the possession vector and the request vector associated with the local device using, for example, the signal generating circuit 400.

At operation 620, the arbitration unit can determine whether the local device has absolute possession of the received token. The arbitration unit can drop one token and consume one token in response to determining that the local device does not have absolute possession of the received token, as shown in operation 635. The arbitration unit can continue to operation 625 in response to determining that the local device does have absolute possession of the received token.

At operation 625, the arbitration unit can determine whether the local device's request vector is empty. The arbitration unit can continue to operation 630 to store one token and consume one token when the request vector is empty. Alternatively, the arbitration unit can proceed to operation 635 to drop one token and consume one token when the request vector is not empty.

Figure 7:
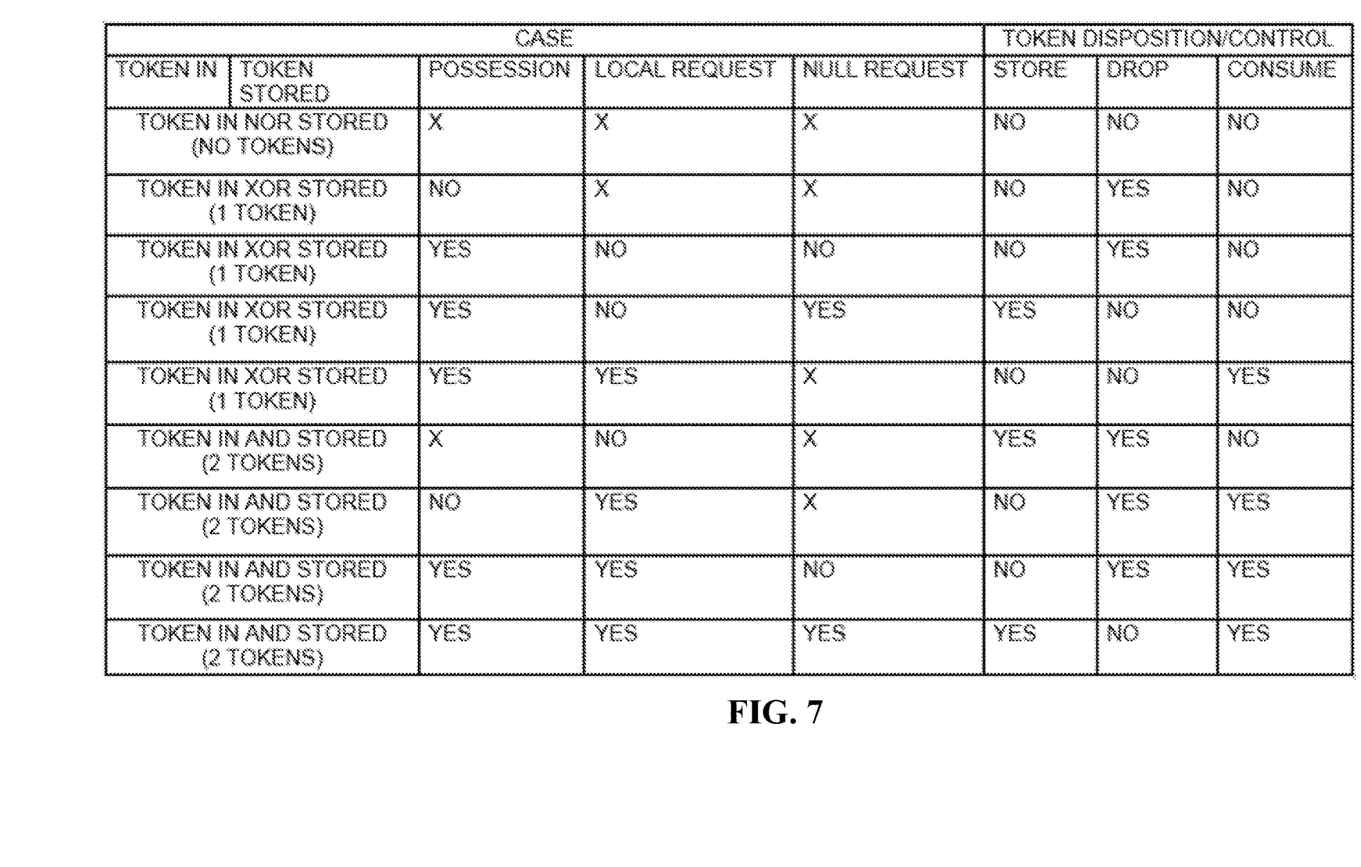
FIG. 7 depicts a table of logic states for the control logic of an arbitration system, according to various embodiments.

FIG. 7 depicts a table of logic states for the control logic of a distributed arbitration system, according to various embodiments. The columns Token In and Token Stored indicate the number of tokens available to a local device in a distributed arbitration system, as described herein. The columns Possession and Null Request, correspond to possession signal 420 and null request signal 440, as shown in FIG. 4 and described herein. The Local Request column indicates whether the local device requested a token. The token disposition and control columns correspond with possible dispositions of a received or stored token, as described herein. In some embodiments, an OR gate means output is "true" if either or both of the inputs are "true." If both inputs are "false," then the output is "false." In some embodiments, an XOR (exclusive-OR) gate acts in the same way as the logical "either/or." The output is "true" if either, but not both, of the inputs are "true." The output is "false" if both inputs are "false" or if both inputs are "true". In some embodiments, an NOR gate is a combination OR gate followed by an inverter. Its output is "true" if both inputs are "false." Otherwise, the output is "false."

FIG. 8 depicts a block diagram of a system including components for implementing the operations and systems to resolve resource contention in a distributed arbitration system, according to various embodiments. The components of the computing device 800 can include one or more processors 806, a memory 812, a terminal interface 818, a storage interface 820, an Input/Output ("I/O") device interface 822, and a network interface 824, all of which are communicatively coupled, directly or indirectly, for inter-component communication via a memory bus 810, an I/O bus 816, bus interface unit ("IF") 808, and an I/O bus interface unit 814.

The computing device 800 may include one or more general-purpose programmable central processing units (CPUs) 806A and 806B, herein generically referred to as the processor 806. In an embodiment, the computing device 800 may contain multiple processors; however, in another embodiment, the computing device 800 may alternatively be a single CPU device. Each processor 806 executes instructions stored in the memory 812.

The computing device 800 may include a bus interface unit 808 to handle communications among the processor 806, the memory 812, the display system 804, and the I/O bus interface unit 814. The I/O bus interface unit 814 may be coupled with the I/O bus 816 for transferring data to and from the various I/O units. The I/O bus interface unit 114 may communicate with multiple I/O interface units 818, 820, 822, and 824, which are also known as I/O processors (IOPs) or I/O adapters (IOAs), through the I/O bus 816. The display system 804 may include a display controller, a display memory, or both. The display controller may provide video, audio, or both types of data to a display device 802. The display memory may be a dedicated memory for buffering video data. The display system 104 may be coupled with a display device 802, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 804 may be on board an integrated circuit that also includes the processor 806. In addition, one or more of the functions provided by the bus interface unit 808 may be on board an integrated circuit that also includes the processor 806.

The I/O interface units support communication with a variety of storage and I/O devices. For example, the terminal interface unit 818 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 826 and the computing device 800, may receive output data via the user output devices. For example, a user interface may be presented via the user I/O device 826, such as displayed on a display device, played via a speaker, or printed via a printer.

The storage interface 820 supports the attachment of one or more disk drives or direct access storage devices 828

(which are typically rotating magnetic disk drive storage devices, although they could alternatively be other storage devices, including arrays of disk drives configured to appear as a single large storage device to a host computer, or solid-state drives, such as a flash memory). In another embodiment, the storage device 828 may be implemented via any type of secondary storage device. The contents of the memory 812, or any portion thereof, may be stored to and retrieved from the storage device 828 as needed. The I/O device interface 822 provides an interface to any of various other I/O devices or devices of other types, such as printers or fax machines. The network interface 824 provides one or more communication paths from the computing device 800 to other digital devices and computer systems.

Although the computing device 800 shown in FIG. 8 illustrates a particular bus structure providing a direct communication path among the processors 806, the memory 812, the bus interface 808, the display system 804, and the I/O bus interface unit 814, in alternative embodiments the computing device 800 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 814 and the I/O bus 808 are shown as single respective units, the computing device 800, may include multiple I/O bus interface units 814 and/or multiple I/O buses 816. While multiple I/O interface units are shown, which separate the I/O bus 816 from various communication paths running to the various I/O devices, in other embodiments, some or all of the I/O devices are connected directly to one or more system I/O buses.

In various embodiments, the computing device 800 is a multi-user mainframe computer system, a single-user system, or a server computer or similar device that has little or no direct user interface, but receives requests from other computer systems (clients). In other embodiments, the computing device 800 may be implemented as a desktop computer, portable computer, laptop or notebook computer, tablet computer, pocket computer, telephone, smart phone, or any other suitable type of electronic device.

In an embodiment, the memory 812 may include a random-access semiconductor memory, storage device, or storage medium (either volatile or non-volatile) for storing or encoding data and programs. In another embodiment, the memory 812 represents the entire virtual memory of the computing device 800, and may also include the virtual memory of other computer systems coupled to the computing device 800 or connected via a network 830. The memory 812 may be a single monolithic entity, but in other embodiments the memory 812 may include a hierarchy of caches and other memory devices. For example, memory may exist in multiple levels of caches, and these caches may be further divided by function, so that one cache holds instructions while another holds non-instruction data, which is used by the processor. Memory 812 may be further distributed and associated with different CPUs or sets of CPUs, as is known in any various so-called non-uniform memory access (NUMA) computer architectures.

The memory 812 may store all or a portion of the components and data shown in FIG. 1-6. These programs and data structures are illustrated in FIG. 1-6 as being included within the memory 812 in the computing device 800; however, in other embodiments, some or all of them may be on different computer systems and may be accessed remotely, e.g., via a network 830. The computing device 800 may use virtual addressing mechanisms that allow the programs of the computing device 800 to behave as if they only have access to a large, single storage entity instead of access to multiple, smaller storage entities. Thus, while the components and data shown in FIG. 1-6 are illustrated as being included within the memory 812, these components and data are not necessarily all completely contained in the same storage device at the same time. Although the components and data shown in FIG. 1-6 are illustrated as being separate entities, in other embodiments some of them, portions of some of them, or all of them may be packaged together.

In an embodiment, the components and data shown in FIG. 1-6 may include instructions or statements that execute on the processor 806 or instructions or statements that are interpreted by instructions or statements that execute the processor 806 to carry out the functions as further described below. In another embodiment, the components shown in FIG. 1-6 may be implemented in hardware via semiconductor devices, chips, logical gates, circuits, circuit cards, and/or other physical hardware devices in lieu of, or in addition to, a processor-based system. In an embodiment, the components shown in FIG. 1-6 may include data in addition to instructions or statements.

FIG. 8 is intended to depict representative components of the computing device 800. Individual components, however, may have greater complexity than represented in FIG. 8. In FIG. 8, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 8 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for processing a token at a local device in a distributed arbitration system, the method comprising:
receiving a first signal from a first device in a set of one or more devices, the set of one or more devices disposed in a chain network downstream from the local device, the first signal indicating a request from each of the one or more devices for access to a shared resource;
receiving an indicator from a processing component of the local device, the indicator indicating whether the processing component requires access to the shared resource;
receiving a second signal from the local device, wherein a component of the second signal indicates whether the local device has a greater priority than another device in the set of one or more devices to access the shared resource;
receiving a token from the chain network, the token granting a device access to the shared resource;
determining a disposition of the token using the first signal and the second signal;

maintaining, based on the determining, a possession vector describing the priority of the first device over other downstream devices in the distributed arbitration system;
disposing the token to allocate the shared resource to a device in response to the determined disposition; and
updating the second signal in response to the determining.

2. The method of claim 1, wherein the disposition of the token is selected from a list consisting of storing the token at the local device, passing the token to the first device, and using the token to access the shared resource.

3. The method of claim 1, wherein the determined disposition of the token is using the token to access the shared resource, and updating the second signal includes modifying a component of the second signal to indicate that each of the one or more devices have a greater priority than the local device to the shared resource.

4. The method of claim 1, wherein the determined disposition of the token is passing the token the first device, and updating the second signal includes modifying the second signal to indicate that at least one of the one or more devices does not have a greater priority than the local device to the shared resource.

5. The method of claim 1, further comprising:
determining that the disposition of the token is at least one of storing the token at the local device and using the token to access the shared resource in response to determining that the first signal indicates that only a first set of devices require access to the shared resource and the second signal indicates that none of the devices in the first set of devices have a greater priority than the local device to the shared resource.

6. The method of claim 1, further comprising:
updating the first signal with the indicator; and
transmitting the updated first signal to a second device, the second node being disposed in the chain network upstream from the local device.

7. The method of claim 1, wherein the token includes at least one of a received token and a captured token.

8. A system for processing a token at a local device in a chain network, the system configured to:
receive a first signal from a first device in a set of one or more devices, the set of one or more devices disposed in a chain network downstream from the local device, the first signal indicating a request from each of the one or more devices for access to a shared resource;
receive an indicator from a processing component of the local device, the indicator indicating whether the processing component requires access to the shared resource;
receive a second signal from the local device, wherein a component of the second signal indicates whether the local device has a greater priority than another device in the set of one or more devices to access the shared resource;
receive a token from the chain network, the token granting a device access to the shared resource;
determine a disposition of the token using the first signal and the second signal;
maintain, based on the determining, a possession vector describing the priority of the first device over other downstream devices in the distributed arbitration system;
dispose of the token to allocate the shared resource to a device in response to the determined disposition; and
update the second signal in response to the determining.

9. The system of claim 8, wherein the disposition of the token is selected from a list consisting of storing the token at the local device, passing the token to the first device, and using the token to access the shared resource.

10. The system of claim 8, wherein the determined disposition of the token is using the token to access the shared resource, and updating the second signal includes modifying a component of the second signal to indicate that each of the one or more devices have a greater priority than the local device to the shared resource.

11. The system of claim 8, wherein the determined disposition of the token is passing the token the first device, and updating the second signal includes modifying the second signal to indicate that at least one of the one or more devices does not have a greater priority than the local device to the shared resource.

12. The system of claim 8, wherein the system is further configured to:
determine that the disposition of the token is at least one of storing the token at the local device and using the token to access the shared resource in response to determining that the first signal indicates that only a first set of devices require access to the shared resource and the second signal indicates that none of the devices in the first set of devices have a greater priority than the local device to the shared resource.

13. The system of claim 8, wherein the system is further configured to:
update the first signal with the indicator; and
transmit the updated first signal to a second device, the second node being disposed in the chain network upstream from the local device.

14. The system of claim 8, wherein the token includes at least one of a received token and a captured token.

15. A computer program product for processing a token at a local device in a chain network, the computer program product including a computer readable storage medium having program instructions embodied therewith, wherein the computer readable storage medium is not a transitory signal per se, the program instructions executable by a processing circuit to cause the processing circuit to perform a method comprising:
receiving a first signal from a first device in a set of one or more devices, the set of one or more devices disposed in a chain network downstream from the local device, the first signal indicating a request from each of the one or more devices for access to a shared resource;
receiving an indicator from a processing component of the local device, the indicator indicating whether the processing component requires access to the shared resource;
receiving a second signal from the local device, wherein a component of the second signal indicates whether the local device has a greater priority than another device in the set of one or more devices to access the shared resource;
receiving a token from the chain network, the token granting a device access to the shared resource;
determining a disposition of the token using the first signal and the second signal;
maintaining, based on the determining, a possession vector describing the priority of the first device over other downstream devices in the distributed arbitration system;
disposing the token to allocate the shared resource to a device in response to the determined disposition; and
updating the second signal in response to the determining.

16. The computer program product of claim 15, wherein the disposition of the token is selected from a list consisting of storing the token at the local device, passing the token to the first device, and using the token to access the shared resource.

17. The computer program product of claim 15, wherein the determined disposition of the token is using the token to access the shared resource, and updating the second signal includes modifying a component of the second signal to indicate that each of the one or more devices have a greater priority than the local device to the shared resource.

18. The computer program product of claim 15, wherein the determined disposition of the token is passing the token the first device, and updating the second signal includes modifying the second signal to indicate that at least one of the one or more devices does not have a greater priority than the local device to the shared resource.

19. The method of claim 1, wherein request vector is visible to all upstream devices.

20. The method of claim 1, further comprising forwarding a request vector to all upstream devices, wherein the request vector gives the authority of the possession vector.

* * * * *